United States Patent [19]

Ritter et al.

[11] Patent Number: 5,005,683
[45] Date of Patent: Apr. 9, 1991

[54] SWITCHABLE CLAMPING ROLLER OVERRUNNING CLUTCH

[75] Inventors: Joachim Ritter, Herzogenaurach; Johann Stark, Weisendorf, both of Fed. Rep. of Germany

[73] Assignee: INA Walzlager Schaeffler KG, Fed. Rep. of Germany

[21] Appl. No.: 457,252

[22] Filed: Dec. 27, 1989

[30] Foreign Application Priority Data

Jan. 31, 1989 [DE] Fed. Rep. of Germany ....... 3902804

[51] Int. Cl.⁵ ..................... F16D 15/00; F16D 23/00; F16D 41/06
[52] U.S. Cl. ...................................... 192/45; 192/47; 188/82.3; 188/82.84
[58] Field of Search .................. 192/45, 47; 188/82.3, 188/82.84

[56] References Cited

U.S. PATENT DOCUMENTS

| | | | |
|---|---|---|---|
| 2,077,253 | 4/1937 | Nardone | 192/47 |
| 2,902,125 | 9/1959 | House et al. | 192/45 |
| 3,187,863 | 6/1965 | Giometti | 192/45 |
| 3,279,571 | 10/1966 | Wassilieff | 192/47 |
| 3,799,306 | 3/1974 | Rist | 192/45 |
| 4,354,585 | 10/1982 | Ritter | 192/47 |

FOREIGN PATENT DOCUMENTS 3002402 7/1981 Fed. Rep. of Germany.
2150239 6/1985 United Kingdom.

Primary Examiner—Allan D. Herrmann
Assistant Examiner—Nicholas Whitelaw
Attorney, Agent, or Firm—Bierman and Muserlian

[57] ABSTRACT

An overrunning clutch comprising a clamping ring provided with clamping ramps and spring-loaded clamping rollers housed in pockets of a cage and associated with the clamping ramps, the clutch being switchable from a first indexing position into a second by rotation of the cage with respect to the clamping ring. The cage is characterized by either directly or with the help of an intermediate member on the one hand, and the clamping ring with projections and recesses on the other, engage in each other in such a way after the fashion of a screw thread that when the cage or the intermediate member, as the case may be, is axially displaced, the cage executes a movement of rotation with respect to the clamping ring.

4 Claims, 2 Drawing Sheets

SWITCHABLE CLAMPING ROLLER OVERRUNNING CLUTCH

STATE OF THE ART

Overrunning clutches comprising a clamping ring provided with clamping ramps and spring loaded clamping rollers housed in pockets of a cage and associated with the clamping ramps, the clutch being switchable from a first indexing position into a second by rotation of the cage with respect to the clamping ring are known, for example from DB-PS 3,002,402. In this clutch, the cage is pressed into an indexing position by a spring in the form of a simple wire ring. At the wire ring, a switching member is formed on which a tangentially directed force can act and thereby rotate the cage into a second indexing position. Since the force required to rotate the cage has to act tangentially, this clutch can only be employed where the overrunning clutch bushing does not rotate with the cage.

This problem is solved in another known overrunning clutch described in British application No. 2,150,239 by the fact that the force required for switching over acts in the axial direction. By this, it is possible to effect a switching over of the clutch even while the cage rotates. In this known clutch, the cage which houses the clamping rollers is provided with an axial extension which has apertures of essentially triangular shape at two diametrically opposite locations, one lateral edge of the triangle extending at an inclination to the longitudinal axis of the overrunning clutch. In these apertures, a bolt which cannot rotate with respect to the cage but which is mounted axially displaceably, engages and can be displaced in the axial direction by a shift linkage. When displaced, the bolt comes to bear against the edges of the apertures in the cage which are inclined with respect to the longitudinal axis of the clutch, thus rotating the cage during its longitudinal displacement. The cage is thus brought from the one indexing position into another. At re-actuation when the first indexing position has to be regained, the bolt is lifted off from the inclined surface of the cage which has to be rotated back into its original position by an additional spring. This known overrunning clutch has a rather complicated structural design because the bolt required for switching, as also the operating linkage for the latter, are additional structural components which have to be accommodated outside the actual clutch. Then again, there is the disadvantage that the cage is brought back into its original position exclusively by the force of a spring, so that if, for example, the spring breaks, a switching over of the overrunning clutch is not possible.

OBJECTS OF THE INVENTION

The object of the invention is to design an overrunning clutch of this type with simple constructional means so that it can be delivered as a ready-to-be-built-in unit which, while being perfect in function, is very cheap to manufacture and for whose operation only a simple external switching member, for example in the form of a longitudinally displaceable ring, has to be provided.

This and other objects and advantages of the invention will become obvious from the following detailed description.

THE INVENTION

The novel overrunning clutch of the invention comprising a clamping ring provided with clamping ramps and spring-loaded clamping rollers housed in pockets of a cage and associated with the clamping ramps, the clutch being switchable from a first indexing position into a second by rotation of the cage with respect to the clamping ring is characterized in that the cage either directly or with the help of an intermediate member on the one hand, and the clamping ring with projections and recesses on the other, engage in each other in such a way after the fashion of a screw thread that when the cage or the intermediate member, as the case may be, is axially displaced, the cage executes a movement of rotation with respect to the clamping ring.

The cage can be axially displaceably mounted in the clamping ring which has radially directed rims at both ends, an axially acting pressure spring being arranged between one of the clamping ring rims and an end face of the cage whereas at the opposite side an axial projection of the cage, which projects axially beyond the clamping ring, is provided with recesses or projections which cooperate after the fashion of a screw thread with proJections or recesses, as the case may be, at the clamping ring.

In such an embodiment, therefore, it is only necessary to exert an axial pressure on the projection of the cage to effect its rotation into a second indexing position. If, subsequently, the pressure force is made inactive, the cage is rotated back into its first indexing position by the intercalated pressure spring. If doubts exist that the pressure spring might break making a repositioning into the first indexing position impossible, this problem can be avoided in that the external switching member is made to interlock with the axial projection of the cage so that the switching member can not only press the cage from a first indexing position into a second, but can also pull it back again into the first indexing position when moved backwards.

A specific method of making such a construction is to provide the projection of the cage with at least one thread-shaped projection e.g. in the form of a radially projecting shoulder which interlocks with a recess of the clamping ring rim situated opposite the pressure spring. To achieve the object of the invention, in this embodiment, as compared to a non-switchable overrunning clutch, no additional parts except for the intercalated pressure spring are required. All that is necessary is, that already existing parts, viz., the cage on the one hand and the clamping ring on the other, are given a special shape by which the rotation of the cage with respect to the clamping ring is achieved.

Whereas in the embodiment described above the cage is axially displaced during switching, according to another embodiment of the invention, it is also possible that the cage does not have to be axially displaced. This is achieved in that the cage is mounted axially indisplaceably at both ends in the clamping ring between radially directed rims and that between the cage and clamping ring a preferably cylindrical intermediate member is axially displaceably mounted and pressed axially outwards under the action of a pressure spring, which intermediate member projects axially beyond clamping ring, the cage and the intermediate member on the one hand and the intermediate member and the clamping ring on the other, engaging in each other, on the one hand after the fashion of a screw thread and on the other in the manner of a longitudinal guide, so that when the intermediate member is axially displaced, the cage executes a movement of rotation with respect to the clamping ring.

In a specific form of this embodiment, an axial projection of the cage can be provided with at least one thread-shaped projection which engages in a corresponding groove of the intermediate member which on the other side is provided with at least one axially extending groove with which a projection of a clamping ring rim interlocks. When in this embodiment an axially acting pressure force is exerted on the end of the intermediate member projecting axialy beyond the clamping ring, the intermediate member is only axially displaced and does not execute a rotational movement with respect to the clamping ring. However, by this axial displacement, it causes due to the projections and recesses engaged in one another after the fashion of a screw thread, a simultaneous, purely rotational movement of the cage without axial displacement of the same.

The drawings illustrate two examples of embodiments of the invention.

Figure 1:
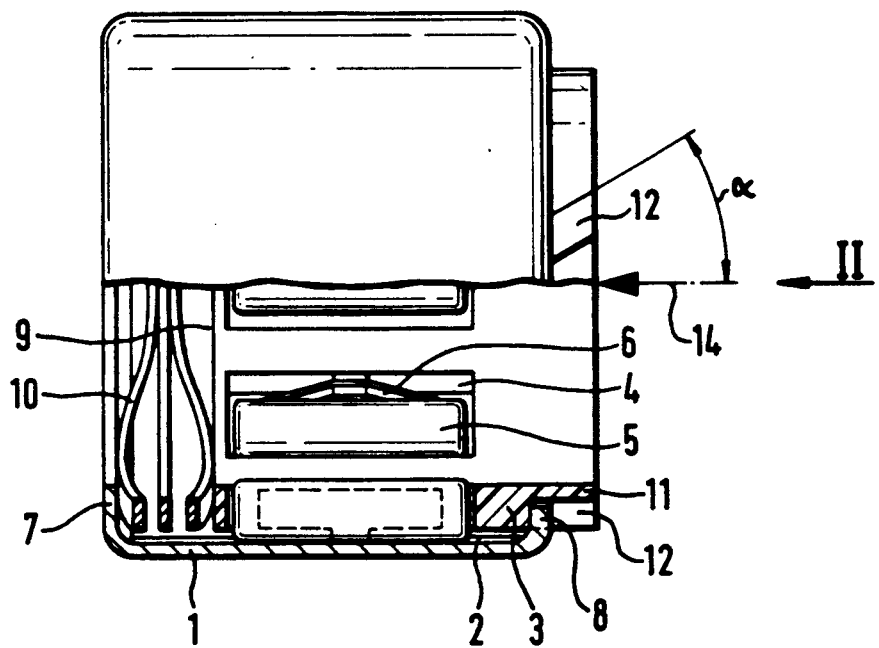
FIG. 1 and 3 are half longitudinal sections through two different forms of embodiments of overrunning clutches.
Figure 2:
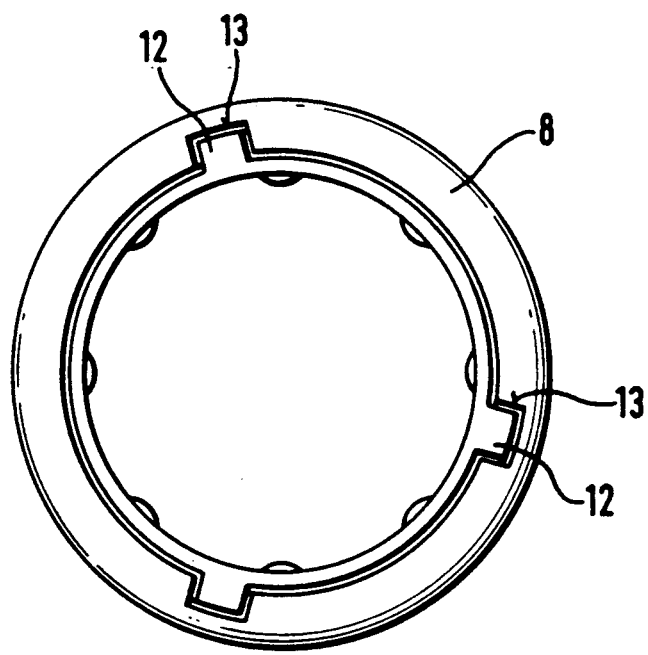
FIG. 2 is a view in the direction of the arrow II of FIG. 1.

The overrunning clutch in FIGS. 2 and 2 comprises the clamping ring 1 with clamping ramps 2 in its bore and has a cage 3 in whose pockets 4 clamping rollers 5 are housed which are subjected to the action of springs 6. The clamping ring 1 has radially inwards directed rims 7 and 8 at both axial ends. Between the rim 7 on one side and the end face 9 of the cage on the other, a pressure spring 10 is arranged which, in the example shown, is made up of two ondular springs separated from each other by an intermediate disk.

At one of its ends, the cage 3 has an axial projection 11 which at some points of its periphery is provided with thread-shaped projections 12 which are inclined at an angle α to the longitudinal axis and engage in corresponding recesses 13 of the rim 8. If it is presumed that in the situation represented, the cage is designed so that it allows an inserted shaft, not shown, to rotate freely in one direction of rotation while clamping in the opposite direction, it would be possible by the action of a force in the direction of the arrow 14 to displace the cage 3 axially towards the left when it would simultaneously undergo a rotation, thus reaching a second indexing position in which an inserted shaft could, for example, rotate freely in both directions of rotation.

Figure 3:
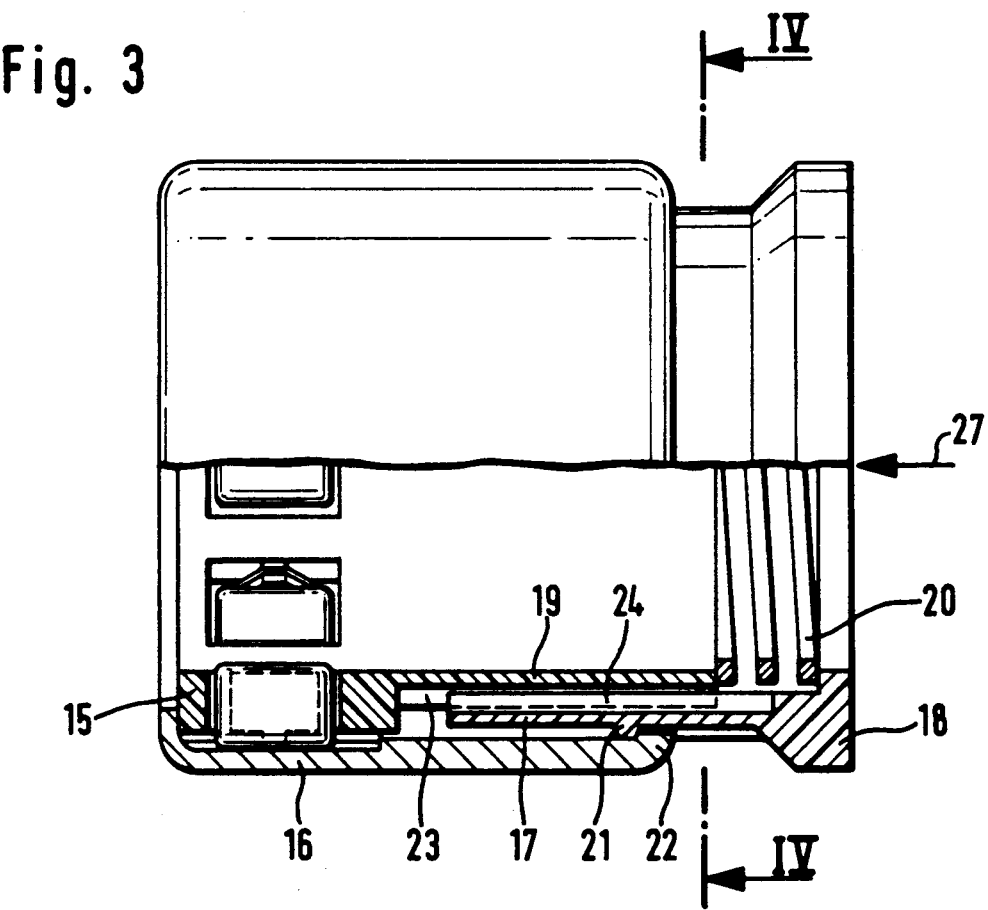
Figure 4:
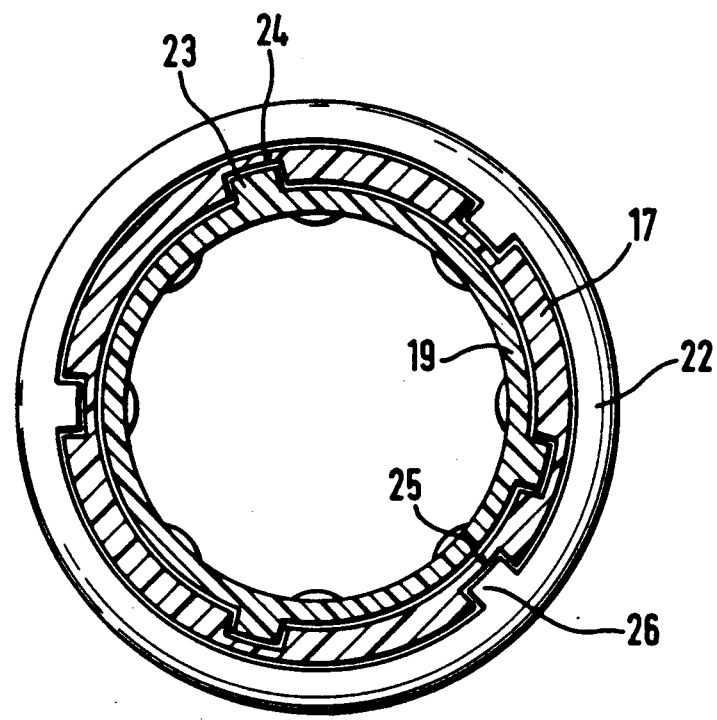
FIG. 4 is a section along line IV—IV of FIG. 3.

The embodiment of FIGS. 3 and 4 differs from the preceding one initially in that the cage 15 is not axially displaced when actuated. Differing from the embodiment previously described, in this case, an intermediate member 17 is provided between the cage 15 on one side and the clamping ring 16 on the other and is made in the form of a cylindrical sleeve projecting at one of its ends axially beyond the clamping ring 16 and provided there with a stop collar 18. Between the axial projection 19 of the cage 15 and a shoulder in the stop collar 18, an axially acting pressure spring 20 is intercalated. To prevent the intermediate member 17 from being pressed completely out of the clamping ring 16 by this pressure spring, a lug 21 which bears against the clamping ring rim 22 is provided at the intermediate member 17.

At some points of its periphery, the axial projection 19 has thread-shaped projections 23 which engage in corresponding grooves 24 of the intermediate member 17. On the other hand, the intermediate member 17 has axially extending grooves 25 at several points of its periphery in which projections 26 of the clamping ring rim 22 engage. If, in this case, a force acting axially in the direction of the arrow 27 is exerted on the stop collar 18 of the intermediate member 17, this intermediate member is moved into the clamping ring 16 and causes a rotational movement of the cage due to the inter-engagement of the projections 23 and the grooves 24 by which movement, a switching over from the original indexing position into another indexing position is effected.

The invention can also be used in the case of such known overrunning clutches in which the clamping ramps are designed so that, starting from a cage position in which the clutch clamps in one direction of rotation, by a rotation of the cage, a middle position is reached in which the clutch does not clamp in any of the two directions of rotation and then by a further rotation of the cage finally, an indexing position is reached in which it clamps in the opposite direction compared to the first indexing position.

Various modifications of the overrunning clutch of the invention may be made without departing from the spirit or scope thereof and it is to be understood that the invention is intended to be limited only as defined in the appended claims.

What we claim is:

1. An overrunning clutch comprising a clamping ring provided with clamping ramps and spring-loaded clamping rollers housed in pockets of a cage and associated with the clamping ramps, the clutch being switchable from a first indexing position into a second by rotation of the cage with respect to the clamping ring characterized in that the cage either directly or with the help of an intermediate member, and the clamping ring with projections and recesses, engage in each other similar to a screw thread that when the cage or the intermediate member, is axially displaced, the cage executes a movement of rotation with respect to the clamping ring and is mounted axially indisplaceably at both ends in the clamping ring between radially directed rims and between the cage and clamping ring, a preferably cylindrical intermediate member is axially displaceably mounted and pressed axially outwards under the action of a pressure spring, which intermediate member projects axially beyond the clamping ring, the cage and the intermediate member and the intermediate member and the clamping ring, engaging in each other similar to a screw thread and in the manner of a longitudinal guide, so that when the intermediate member is axially displaced, the cage executes a movement of rotation with respect to the clamping ring.

2. A clutch of claim 1 characterized in that the projection of the cage is provided with at least one thread-shaped projection which interlocks with a recess of the clamping ring rim situated opposite the pressure spring.

3. A clutch of claim 1 characterized in that the cage is mounted axially indisplaceably at both ends in the clamping ring between radially directed rims and between the cage and clamping ring a preferably cylindrical intermediate member is axially displaceably mounted and pressed axially outwards under the action of a pressure spring, which intermediate member projects axially beyond the clamping ring, the cage and the intermediate member and the intermediate member and the clamping ring, engaging in each other similar to a screw thread and in the manner of a longitudinal guide, so that when the intermediate member is axially displaced, the cage executes a movement of rotation with respect to the clamping ring.

4. A clutch of claim 3 characterized in that an axial projection of the cage is provided with at least one thread-shaped projection which engages in a corresponding groove of the intermediate member which on the other side is provided with at least one axially extending groove with which a projection of a clamping ring rim interlocks.

* * * * *